United States Patent [19]

Vali et al.

[11] Patent Number: 5,750,901

[45] Date of Patent: May 12, 1998

[54] OPTICAL FIBER APPARATUS AND METHOD FOR MEASURING GEOLOGICAL STRAINS

[75] Inventors: Victor Vali, Laguna Hills; I-Fu Shih, Los Alamitos; Kenn S. Bates, Long Beach, all of Calif.

[73] Assignee: Hughes Aircraft Company, Los Angeles, Calif.

[21] Appl. No.: 483,006

[22] Filed: Jun. 7, 1995

[51] Int. Cl.$^6$ ............................................. G01L 1/24
[52] U.S. Cl. ................................. 73/800; 73/786
[58] Field of Search ........................ 73/784, 786, 800, 73/812

[56] References Cited

U.S. PATENT DOCUMENTS

| | | | |
|---|---|---|---|
| 4,654,520 | 3/1987 | Griffths | 73/800 X |
| 4,788,868 | 12/1988 | Wilk | 73/800 X |
| 5,148,017 | 9/1992 | Wolff et al. | 73/800 X |
| 5,182,449 | 1/1993 | Johnson et al. | 73/800 X |
| 5,381,492 | 1/1995 | Dooley et al. | 73/800 X |

Primary Examiner—Elizabeth L. Dougherty
Attorney, Agent, or Firm—G. S. Grunebach; M. W. Sales; W. K. Denson-Low

[57] ABSTRACT

A measurement optical fiber is placed into contact with a geological structure, and a reference optical fiber of about the same length is not contacted to the geological structure. An input beam of light is transmitted down the lengths of the measurement and reference optical fibers, and the interference fringes formed between the reflected beams in the two optical fibers are counted to determine the geological displacement, and thence the geologic strain, experienced by the measurement optical fiber. Preferably, multiple pairs of the measurement and reference optical fibers are used, the optical fibers of the various pairs being of different lengths. The difference in displacement measured by any two pairs is a measure of the geological strain in the region between the ends of the two pairs. The multiple pairs are conveniently provided in two optical fiber cables, a measurement cable which contacts the geological structure and a reference cable which extends parallel and adjacent to the measurement cable.

19 Claims, 4 Drawing Sheets

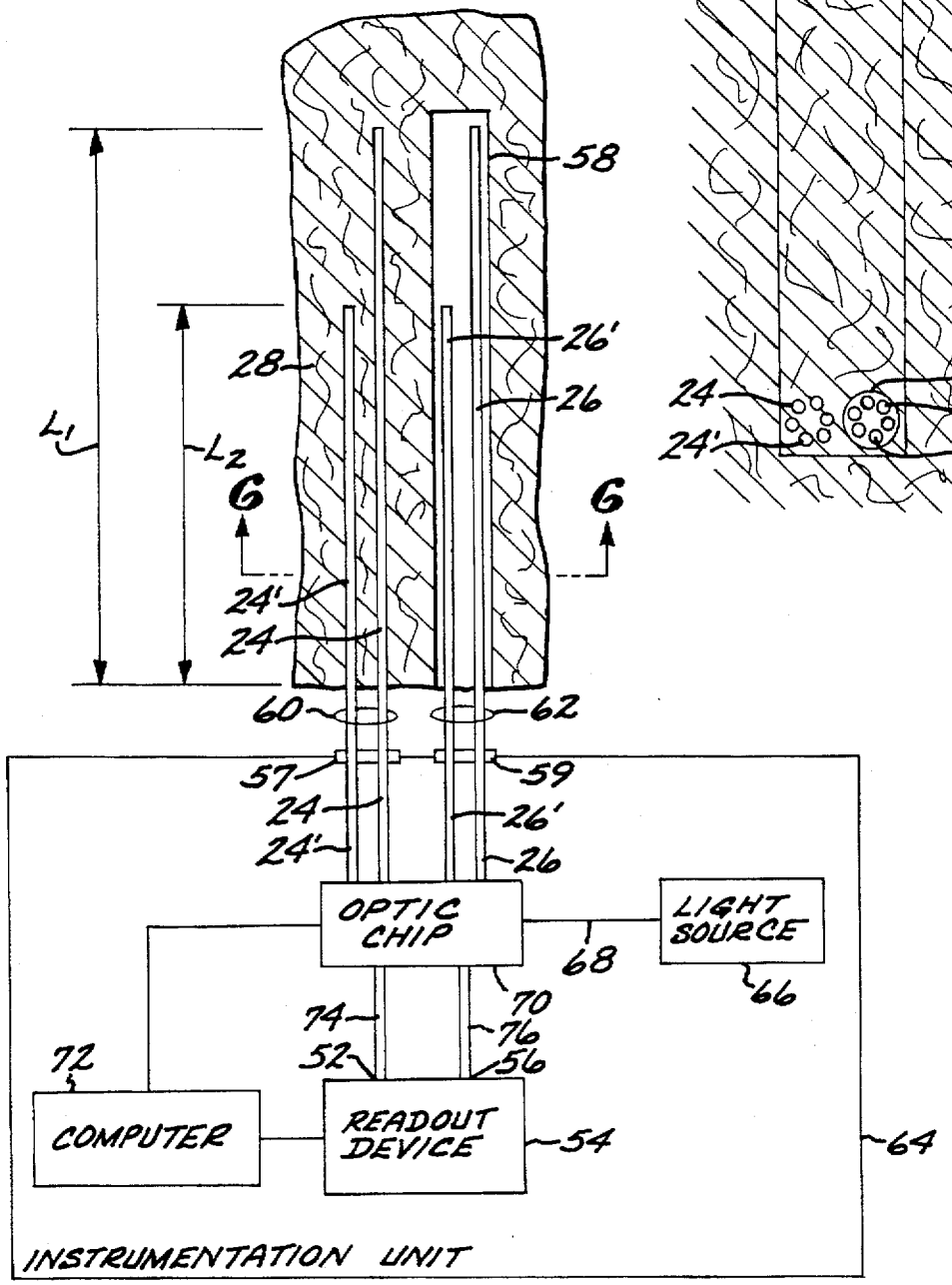
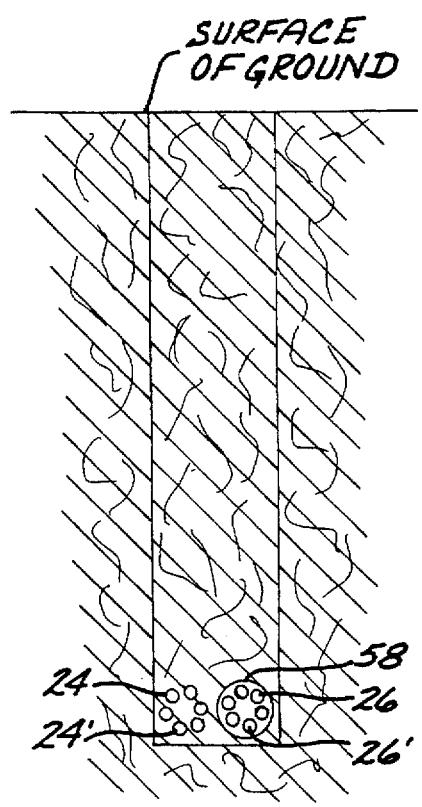

OPTICAL FIBER APPARATUS AND METHOD FOR MEASURING GEOLOGICAL STRAINS

BACKGROUND OF THE INVENTION

This invention relates to the measurement of geological strains, and, more particularly, to the measurement of such strains by interferometry.

The surface of the earth is formed of plates that can move relative to each other along their lines of intersection, which are termed fault lines. As the plates move, strains build up along the fault lines. When the strains reach a maximum value that can be sustained by the geological structure, they are released by a slipping movement of the plates relative to each other. The result of a large, rapid relative movement of the plates that meet at a fault line is an earthquake.

Earthquakes are of great practical interest because of their effects on man, and of great scientific interest because they give information about the nature of the plates and faults. Many geologists believe that the occurrence of an earthquake along a fault will someday be predictable from the accumulation of strains along that fault over a period of time, although reliable prediction methods do not as yet exist. An important part of the development of prediction methods is the ability to supply accurate data on the accumulation of geological strains along the various known fault systems in the world.

A number of techniques are known for measuring geological strains as a function of time. Some, such as observing geological features or other markers that span a fault, give an indication of the strain cross the fault over a long period of time. Others, such as surveying techniques, indicate the strain across the fault over a shorter period of time. While of interest in understanding the geology of the fault, these techniques do not yield information that is of direct value in predicting the occurrence of an earthquake to a reasonable degree of accuracy. In order to make accurate predictions, it is necessary to be able to measure very small strains across the fault and strain distributions near to the fault, as a function of the distance from the fault, that change over relatively short periods of time.

The most accurate geological strain meters currently available are laser interferometers. In such devices, a measurement laser beam is directed in a first direction (e.g., across the vault), and simultaneously a coherent reference laser beam is directed perpendicular to the first direction. The beams are reflected back to the source from reflectors, and the relative movement of the reflectors, and thence the strain across the fault, is obtained by counting interference fringes produced by the interference of the received beams. This method is highly accurate. The laser interferometer measurement instrument, however, is rather bulky and is expensive to build and operate. It is not robust in harsh environments over the extended periods of time during which it sometimes must operate to obtain the strain data, and may be damaged by a severe earthquake. Relatively long lines of sight are retained across the fault and parallel to the fault. The existing laser interferometers also do not provide information on strain distributions and gradients near to the fault, in addition to gross strain measurement across the fault.

There is a need for an improved approach to the measurement of small geological strains, particularly adjacent to fault lines. The approach would desirably provide measurements of strain distributions at and near to faults, and would be robust and inexpensive. The present invention fulfills this need, and further provides related advantages.

SUMMARY OF THE INVENTION

The present invention provides a method and apparatus for measuring geologic strains and strain distributions, and is of particular value for measuring such strains and strain distribution near fault lines. The apparatus is highly accurate, producing strain data of the same degree of accuracy as a laser interferometer. The apparatus is readily constructed and utilized. It does not require a long line of sight. The apparatus is relatively inexpensive yet robust in service.

In accordance with the invention, an apparatus for performing strain measurements of a geological structure comprises an interferometric readout device having an measurement input and a reference input. There is a measurement optical fiber having a first end and having a reflective second end thereof. The measurement optical fiber is in contact with a geological structure along at least a portion of the length of the measurement optical fiber, preferably almost its entire length. The apparatus further includes a reference optical fiber having a first end and having a reflective second end thereof. There is a light source of an input beam of light, and a beam director. The beam director includes means for directing the input beam of light from the light source into both the first end of the measurement optical fiber and the first end of the reference optical fiber, for directing a reflected measurement beam of light from first end of the measurement optical fiber into the measurement input, and for directing a reflected reference beam of light from the first end of the reference optical fiber into the reference input.

In the preferred use of this apparatus, the measurement optical fiber contacts the geologic structure and is strained as the geological structure strains. The reference optical fiber does not contact the geological structure, and is therefore not strained. As used herein in relation to an optical fiber "contacting" a geological structure, "contact" means that the optical fiber is fixed in relation to the geological structure in such a manner that strain experienced by the geological structure is transmitted into the optical fiber. A measurement of the length change of the optical fiber is therefore a good indication of the geologic length change and thence the strain experienced by the geological structure. "Contact" is preferably achieved by having the optical fiber in the ground so that the frictional contact of the ground transmits its strains into the optical fiber. "Contact" as used herein would not be attained simply by placing the optical fiber onto the surface of the ground, because the strains experienced by the geological structure would not be transmitted into the optical fiber. "Contact" would also not be attained if the optical fiber is loosely placed into a pipe which is then burned in the ground, because the optical fiber would be free to slip relative to the geologic structure.

The measurement optical fiber and the reference optical fiber need not be of the same length, as only their length change relative to each other is measured by the interferometric technique. However, it is preferred that they be of about the same length, and that they be positioned in a parallel, adjacent manner during the measurement process so that they experience substantially the same conditions of temperature and pressure along their lengths. This positioning can be readily achieved by burying the measurement optical fiber in a trench directly in the soil, placing the reference optical fiber loosely into a pipe, and burying the pipe in the same trench such that the reference optical fiber does not contact the soil. The reference optical fiber is subjected to substantially the same temperature and pressure along its length as the measurement optical fiber, so that these potential sources of inaccuracy in the measurement of relative length changes are neglected.

In one embodiment of the invention, an apparatus for performing strain measurements of a geological structure comprises an interferometric readout device having an measurement input and a reference input, a plurality of measurement/reference pairs of optical fibers, which each measurement/reference pair being of a different length. Each measurement/reference pair includes a measurement optical fiber having a first end and having a reflective second end thereof. The measurement optical fiber cable is in contact with a geological structure along at least a portion of the length of the measurement optical fiber. The measurement/reference pair also includes a reference optical fiber having a first end and having a reflective second end thereof. There is a coherent light source of an input beam of light, and a beam director including means for selectively directing the input beam of light into a selected measurement/reference pair, for directing a reflected measurement beam of light from the first end of the measurement optical fiber of the selected measurement/reference pair into the measurement input, and for directing a reflected reference beam of light from the first end of the reference optical fiber of the selected measurement/reference pair into the reference input.

The use of pairs of measurement/reference optical fibers of different lengths allows the geological strain distribution as a function of position to be mapped. Each measurement/reference pair is used to determine a length change along its length. The difference between the length changes of two measurement/reference pairs of different lengths is the length change in the region between their respective second ends. This difference in length changes, divided by the distance between the respective second ends, is the geologic strain in the region between the reflective second ends. A single conventional laser interferometer cannot provide information on such geological strain distributions. Because the optical fibers are small—on the order of about 0.010 inches in diameter each, a large number of measurement/reference pairs can be placed into a relatively small diameter. In the preferred practice, the measurement/reference pairs are divided into two optical fiber cables, one containing the measurement optical fibers that is placed into contact with the geological structure, and the other containing the reference optical fibers that do not contact the geological structure.

The present invention thus provides an important advance in the art of geological strain measurements. The interferometric readout device, light source, and beam director can be made compact and rugged. The optical fibers or optical fiber cables are positioned so as to provide accurate measurements of very small values of geological strains. Other features and advantages of the present invention will be apparent from the following more detailed description of the preferred embodiments, taken in conjunction with the accompanying drawings, which illustrate, by way of example, the principles of the invention.

BRIEF DESCRIPTION OF THE DRAWINGS

FIG. 5 is a schematic drawing of a fourth embodiment of an apparatus in accordance with the invention;

FIG. 6 is a sectional view through the apparatus of FIG. 5, taken along lines 6—6.

DETAILED DESCRIPTION OF THE INVENTION

Figure 1:
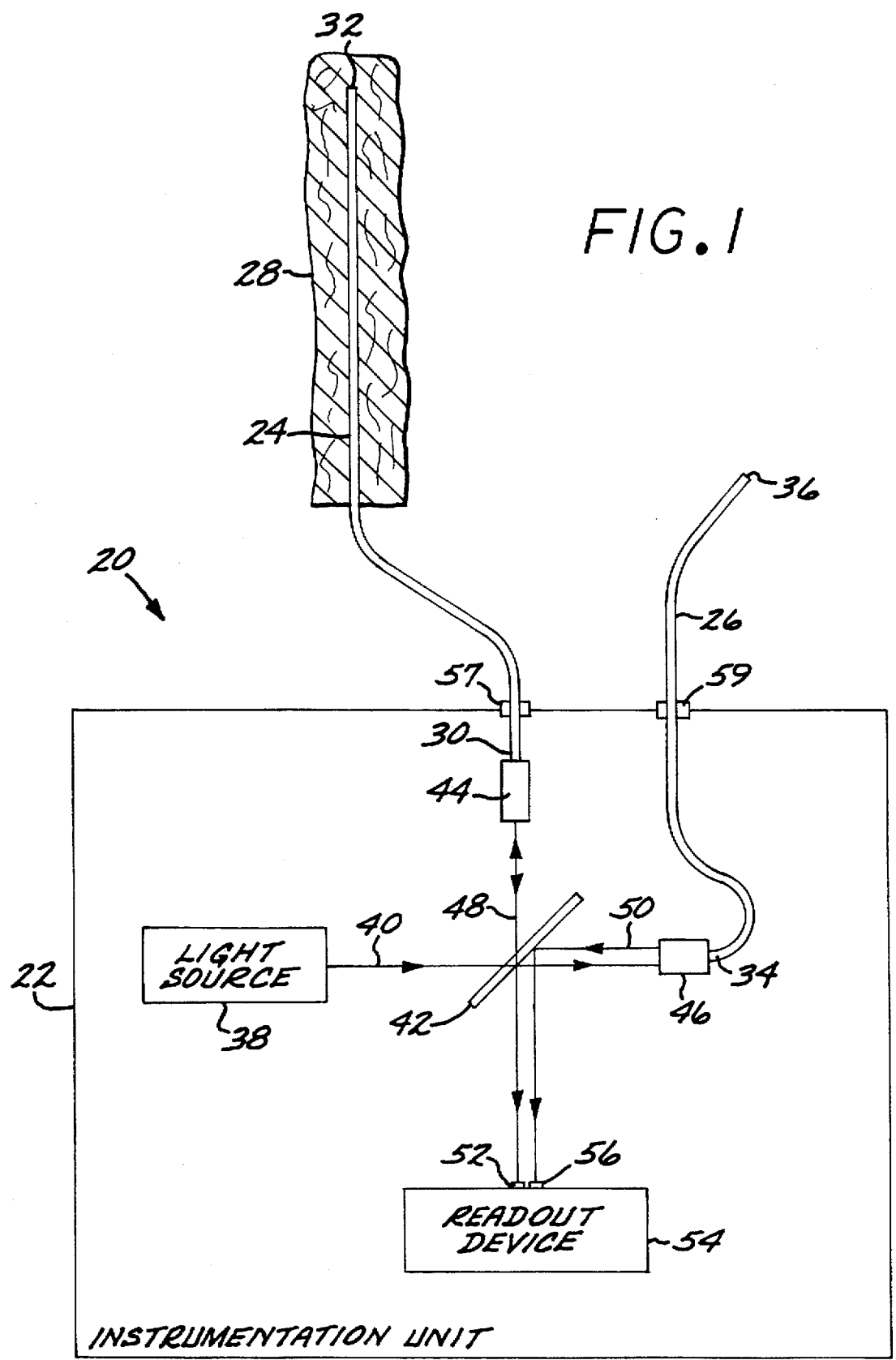
FIG. 1 is a schematic drawing a first embodiment of an apparatus in accordance with the invention.

FIG. 1 depicts an apparatus 20 used to perform strain measurements of a geological structure. The apparatus 20 includes an instrumentation unit 22 and at least two optical fibers, a measurement optical fiber 24 and a reference optical fiber 26, extending from the measurement unit 22. The measurement optical fiber 24 is in contact with a geological structure 28 over at least a portion of its length, so that geological displacements in the geological structure 28 are experienced by the measurement optical fiber 24. The reference optical fiber 26 does not contact the geological structure 28 in the sense that the geological displacements in the geological structure are not experienced by the reference optical fiber 26. The measurement optical fiber 24 has a first end 30 at the instrumentation unit 22 and a remote second end 32 which is silvered or otherwise treated to be reflective. The reference optical fiber has a first end 34 at the instrumentation unit 22 and a remote second end 36 which is silvered or otherwise treated to be reflective. In the embodiment of FIG. 1, the measurement optical fiber 24 and the reference optical fiber 2 are not of the same length. The measurement optical fiber 24 and the reference optical fiber 26 are not necessarily of the same length, inasmuch as only relative displacements are measured. In other embodiments to be discussed subsequently, the measurement optical fiber 24 and the reference optical fiber 26 are made to be about the same length. In all of the embodiments, the measurement optical fiber 24 can be of any required length, as long as a light beam can be transmitted therethrough and reflected back to a readout device with sufficient intensity to perform the required interference measurements. In a typical case, the measurement optical fiber 24 can be as long as about 1 to 100 kilometers or more.

The instrumentation unit 22 includes a coherent light source 38, which is preferably a polarized semiconductor laser diode or a He—Ne laser which is frequency and temperature stabilized. The light source has a beam 40, also termed the input beam because it is input to the optical fibers 24 and 26. The beam 40 is incident upon a beam director 42, which is preferably a mirror silvered so as to transmit a ½ of the incident light and reflect about ½ of the incident light. The beam director 42 splits the beam 40, preferably so that about ½ of the energy falls upon an measurement beam optical coupler 44, and about ½ of the energy falls upon a reference beam optical coupler 46. Other beam splitting ratios may be used, as where the lengths of the optical fibers 24 and 26 are very different and more light energy is to be directed into the longer of the optical fibers. The optical couplers 44 and 46 couple the beams travelling through free space into the respective measurement optical fiber 24 and reference optical fiber 26. The light energy travelling in the optical fibers 24 and 26 travels to their respective second ends 32 and 36, and is reflected back along the lengths of the respective optical fibers 24 and 26 as reflected beams 48 and 50 to the respective optical couplers 44 and 46. From the optical couplers 44 and 46, the measurement reflected beam 48 passes through the beam director 42 and the reference reflected beam 50 is reflected by the beam director 42. The measurement reflected beam 48 is received at a measurement input 52 of a readout device 54, and the reference reflected beam 50 is received at a reference input 56 of the readout device 54. The readout device permits the reflected beams 48 and 50 to interfere to produce interference fringes. The relative movement of these interference fringes is an indicator of the relative path length changes or the relative displacements of the second ends 32 and 36, as is well known in the field of interferometry. As a convenience, the portions of the optical fibers 24 and 26 that lie within the instrumentation unit 22 are preferably connected to those portions of the respective optical fibers 24 and 26 that lie outside of the instrumentation unit 22 by respective optical fiber connectors 57 and 59.

The components of the present apparatus 20 are available commercially, but have not heretofore been arranged and used as in the present invention. Suitable optical fiber materials is available as glass single-mode communication-type optical fiber from manufacturers such as Corning or Lightwave Technology. A He—Ne, argon ion, or semiconductor laser or sufficient power is available from Spectra Physics Corp. or Newport Corp. A partially silvered mirror for use as the beam director is available from Newport Corp. Optical couplers are available from AMP, Inc. or Newport Corp. An interferometric readout device or interferometric fractional fringe counter suitable for the present application is available from Canadian Instrumentation and Research Limited. Optical fiber connectors are available from Newport Corp.

Figure 2:
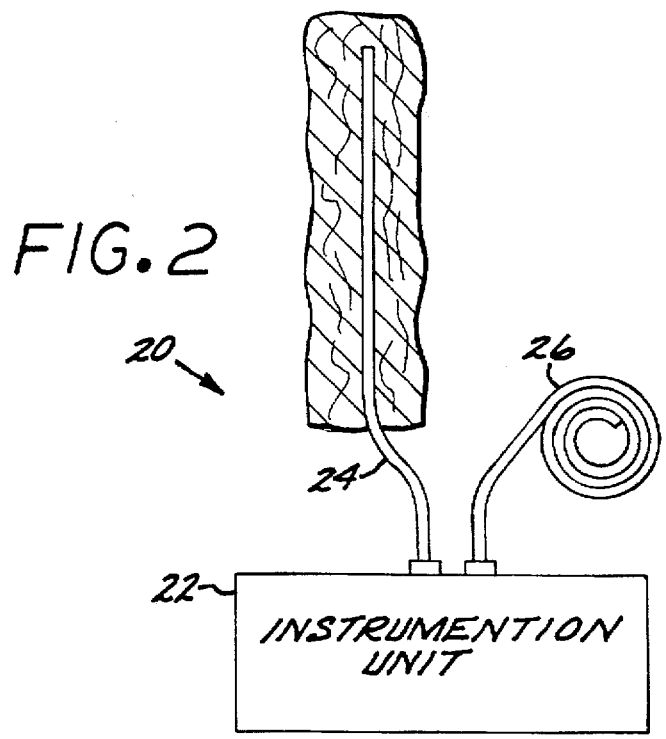
FIG. 2 is a schematic drawing of a second embodiment of an apparatus in accordance with the invention.

FIG. 2 depicts another embodiment of the invention in which the measurement optical fiber 24 and the reference optical fiber 26 are of about the same length, but which is otherwise identical to the apparatus shown in FIG. 1. In both of these embodiments, the reference optical fiber 26 is placed or coiled at the instrumentation unit 22. The reference optical fiber 26 may instead be placed into a controlled-environment chamber to control its temperature and/or the externally applied pressure on the reference optical fiber 26.

Figure 3:
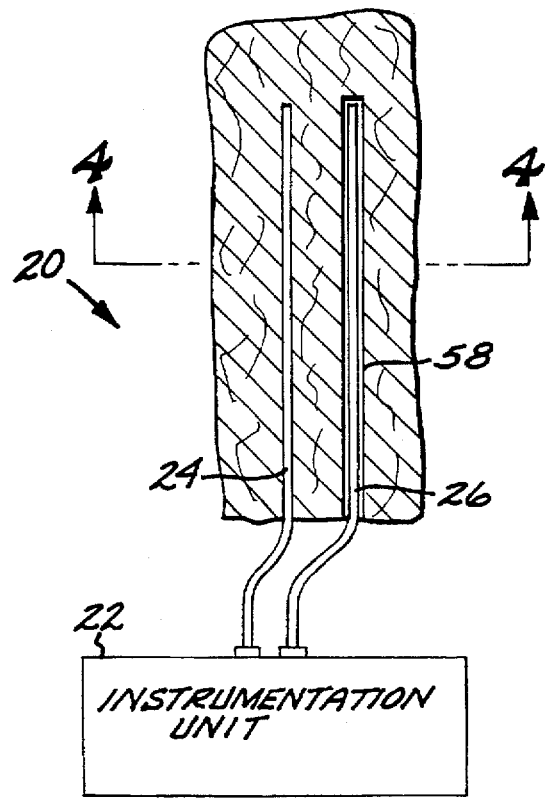
FIG. 3 is a schematic drawing of a third embodiment of an apparatus in accordance with the invention.
Figure 4:
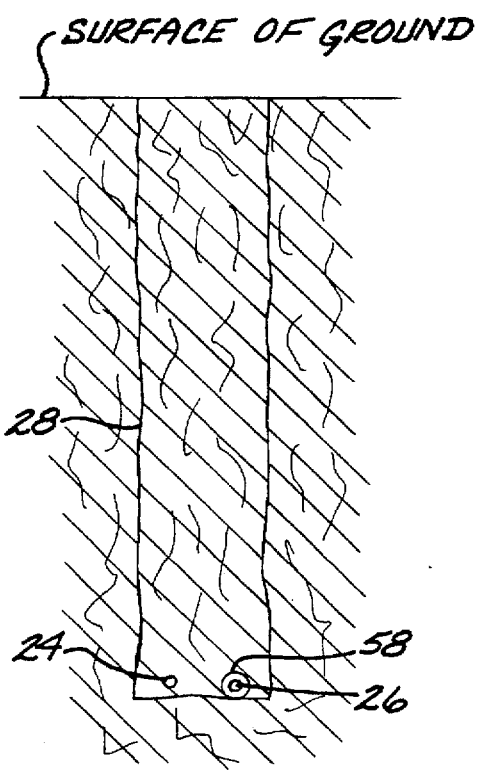
FIG. 4 is a sectional view through the apparatus of FIG. 3, taken along lines 4—4.

In its preferred, however, to provide the measurement optical fiber 24 and the reference optical fiber 26 of about the same length, to place the measurement optical fiber 24 into contact with the geological structure, and to place the reference optical fiber 26 into the geological structure 28 but not in contact with the geological structure 28. FIGS. 3 and 4 depict such an apparatus 20. The reference optical fiber 26 is placed loosely within a tube 58 that allows the reference optical fiber to change length responsive to temperature and passive changes, but does not allow it to contact the geological structure 28 and change length responsive to movement in the geological structure. The measurement optical fiber 24 and the tube 58 containing the reference optical fiber 26 are typically buried in a trench parallel to and immediately adjacent to each other.

The reason for using optical fibers 24 and 26 of about the same length and positioning the optical fibers 24 an 26 in this manner is so that they are subjected to approximately the same temperatures and pressures within the geological structures. Variations in temperature and pressure can cause length changes in the optical fibers 24 and 26 apart from any length changes in the measurement optical fiber 24 caused by its contact to the geological structure. In the self-compensating approach of FIGS. 3 and 4, these variations are experienced equally by the two optical fibers 24 and 26, so that there is no net effect due to these extraneous influences. The embodiments where there is no such self compensation, as in FIGS. 1 and 2, are operable for those situations where the extraneous influences are known to be small. The self-compensating approach of the present invention provides an important advance over prior interferometric approaches, in which such compensation between the measurement leg and the reference leg is difficult or impossible to perform. In these prior approaches, there must be a clear optical path for the beams, which are normally placed at right angles to each other. There can be significant extraneous effects that are experienced by the reflective targets in the prior approach.

FIGS. 5 and 6 illustrate another embodiment wherein there are multiple pairs of measurement and reference optical fibers of differing lengths, and wherein an integrated optic chip is used to direct the beam. There is a first measurement/reference pair comprising a first measurement optical fiber 24 and a first reference optical fiber 26. Additionally, there is a second measurement/reference pair comprising a second measurement optical fiber 24' and a second reference optical fiber 26'. The first and second measurement optical fibers 24 and 24' are bundled together in a measurement cable 60, and the first and second reference optical fibers 26 and 26' are bundled together in a reference cable 60. (There are preferably more than two measurement optical fibers in the bundle 60, and more than two reference optical fibers in the bundle 62, as shown in FIG. 6.) The measurement cable 60 contacts the geological structure, and the reference cable 62 is placed inside the tube 58, which in turn is buried in the geological structure parallel and adjacent to the measurement cable 60 for the reasons discussed previously.

Differing lengths of measurement/reference pairs are used to obtain data on the geological displacements and thence the strains as a function of position through the geological structure. If only a single measurement/reference pair is used, as in the embodiments of FIGS. 1–4, then only a single net displacement and net strain through the geological structure can be obtained. In the embodiment of FIG. 5, the geological displacement $D_1$ over the length $L_1$ is obtained from the measurements of the first measurement/reference pair using the optical fibers 24 and 26, and the geological displacement $D_2$ over the length $L_2$ is obtained from the measurements of the second measurement/reference pair using the optical fibers 24' and 26'. The geological strain over the length $L_1$ is $D_1/L_1$, the geological strain over the length $L_2$ is $D_2/L_2$, and the geological strain in that portion of the geological structure that lies between the end of the second measurement optical fiber 24' and the end of the first measurement optical fiber 24 is $(D_1-D_2)(L_1-L_2)$.

Optical fibers are quite small in size, typically about 0.010 inches in diameter. Consequently, many measurement/reference pairs of different lengths can be placed into the cables 60 and 62. This arrangement permits the principles illustrated in FIGS. 5 and 6 and discussed in the preceding paragraph to be extended to the measurement of geological strains along the length of the geological structure with excellent positional accuracy. Such accurate measurements of the displacement and strain distributions through a geological structure are not possible with existing approaches.

The instrumentation unit is modified to accommodate the multiple measurement/reference pairs. It would be possible to use one instrumentation unit for each pair, but because the displacements do not change rapidly, it is preferred to use a single instrumentation unit 64 that can perform the interferometric measurements of all of the measurement/reference pairs in a multiplexed manner. In the preferred embodiment of the instrumentation unit 64, a light source 66 directs a beam 68 into an integrated optic chip 70, which is available commercially. Under the control of a computer 72, the optic chip 70 selectively directs light into one of the measurement/reference pairs at a time, acting as a multiplexer. The optic chip 70 receives the reflected measurement and reference light beams from the respective optical fibers, and directs them through respective optical fibers 74 and 76 to the respective inputs 52 and 56 of the readout device 54. The readout device 54 measures interference fringe displacements to determine geological displacements, and provides this information to the computer 72 for storage with the identification of the measurement/reference pair then active and the time, and any other pertinent information. The readout device 54 and other structure of the instrumentation unit 64 which is identical to that of the instrumentation unit 22 has been assigned the same reference numerals in FIG. 5, and the preceding discussion of these elements is incorporated here.

Figure 7:
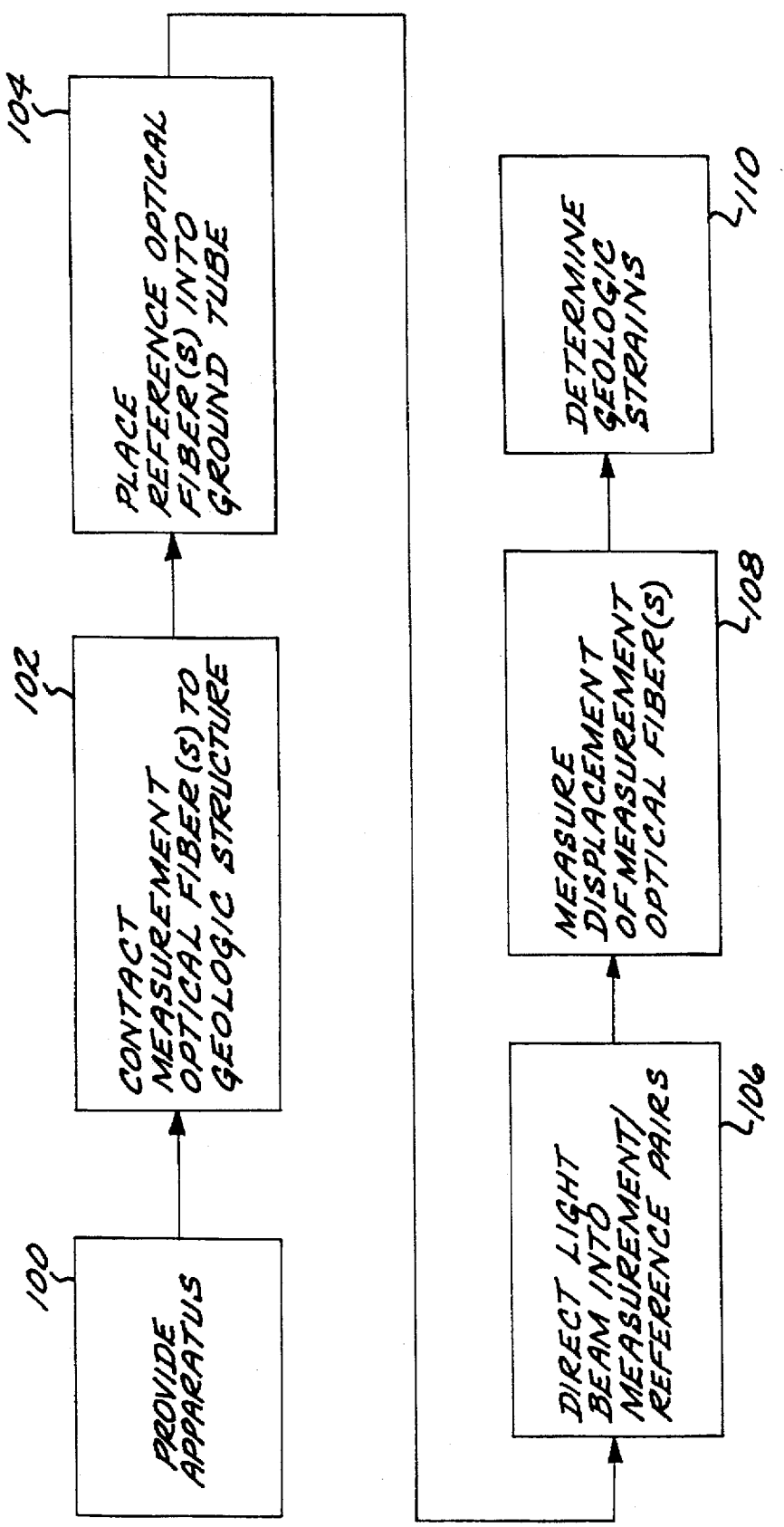
FIG. 7 is a block diagram of a method for practicing the invention.

FIG. 7 illustrates, in block diagram form, a preferred method for practicing the invention. An apparatus is provided, in any of the forms illustrated in FIGS. 1–6 or other operable form, numeral 100. The measurement optical fiber(s) are placed into contact with the geological structure, numeral 102. The reference optical fiber(s) are placed into a tube in the ground, numeral 104, so that they cooperate with the measurement optical fiber(s) to achieve self compensation but so that they do not contact the geological structure to experience its displacements and strains. The coherent light beam is directed into the measurement/reference optical fiber pair(s), selectively if there is more than one pair, numeral 106. The reflected measurement and reflected light beams are directed into the readout device, in which the geologic displacements are measured, numeral 108. The geological strains are determined in the manner previously discussed, numeral 110.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An apparatus for performing differential strain measurements of a geological structure, comprising:

interferometric readout device having a measurement input a multiplicity of measurement optical fibers having varying lengths and first ends and having reflective second ends thereof, the multiplicity of measurement optical fibers being in contact with a geological structure along at least a portion of the length of the multiplicity of measurement optical fibers;

a multiplcity of reference optical fibers having varying lengths having first ends and having reflective second ends thereof;

a light source of an input beam of light; and a beam director including means for directing the input beam of light from the light source into both the first ends of the measurement optical fibers and the first ends of the reference optical fibers, for directing a reflected measurement beam of light from the first ends of the measurement optical fibers into the measurement input, and for directing a reflected reference beam of light from the first ends of the reference optical fibers into the reference input.

2. The apparatus of claim 1, wherein the measurement optical fibers and the reference optical fibers are of substantially the same lengths.

3. The apparatus of claim 1, wherein the reference optical fibers pass through the geological structure without contacting the geological structure over at least a portion of the length of the reference optical fibers.

4. The apparatus of claim 1, wherein the reference optical fibers extend parallel and adjacent to the measurement optical fibers, and wherein the reference optical fibers do not contact the geological structure.

5. An apparatus for performing strain measurements of a geological structure, comprising:

an interferometric readout device having a measurement input and a reference input;

a measurement optical fiber having a first end and having a reflective second end thereof, the measurement optical fiber being in contact with a geological structure along at least a portion of the length of the measurement optical fiber;

a reference optical fiber having a first end and having a reflective second end thereof;

a light source of an input beam of light; and a beam director including means for directing the input beam of light from the light source into both the first end of the measurement optical fiber and the first end of the reference optical fiber, for directing a reflected measurement beam of light from the first end of the measurement optical fiber into the measurement input, and for directing a reflected reference beam of light from the first end of the reference optical fiber into the reference input, wherein the beam director is formed on an integrated optic chip.

6. An apparatus for performing differential strain measurements of a geological structure, comprising:

an interferometric readout device having a measurement input and a reference input;

a measurement optical fiber cable, the measurement optical fiber cable comprising a plurality of measurement optical fibers of different lengths, each of the measurement optical fibers having a first end and having a reflective second end thereof, the measurement optical fiber cable being in contact with a geological structure along at least a portion of the length of the measurement optical fiber cable;

a reference optical fiber cable, the reference optical fiber cable comprising at least one reference optical fiber, each reference optical fiber having a first end and having a reflective second end thereof;

a light source of an input beam of light; and beam director including means for directing the input beam of light from the light source into both the first end of a selected one of the measurement optical fibers and the first end of the at least one reference optical fiber, for directing a reflected measurement beam of light from the first end of the selected one of the measurement optical fibers into the measurement input, and for directing a reflected beam of light from the first end of the at least one reference optical fiber into the reference input.

7. The apparatus of claim 6, wherein the reference optical fiber cable comprises a plurality of reference optical fibers of a plurality of different lengths, and wherein each measurement optical fiber is paired with one of the reference optical fibers of substantially the same length to form a measurement/reference pair.

8. The apparatus of claim 6, wherein the reference optical fiber of the measurement/reference pair passes through the geological structure without contacting the geological structure over at least a portion of the length of the reference optical fiber.

9. The apparatus of claim 7, wherein the reference optical fiber of each pair extends parallel and adjacent to the measurement optical fiber of each pair, and wherein the reference optical fiber does not contact the geological structure.

10. The apparatus of claim 6, further including a tube through which the reference optical fiber cable passes.

11. An apparatus for performing strain measurements of a geological structure, comprising:

an interferometric readout device having a measurement input and a reference input;

a measurement optical fiber cable, the measurement optical fiber cable comprising a plurality of measurement optical fibers of different lengths, each of the measurement optical fibers having a first end and having a reflective second end thereof, the measurement optical fiber cable being in contact with a geological structure along at least a portion of the length of the measurement optical fiber cable;

a reference optical fiber cable, the reference optical fiber cable comprising at least one reference optical fiber, each reference optical fiber having a first end and having a reflective second end thereof;

a light source of an input beam of light; and a beam director including means for directing the input beam of light from the light source into both the first end of a selected one of the measurement optical fibers and the first end of the at least one reference optical fiber, for directing a reflected measurement beam of light from the first end of the selected one of the measurement optical fibers into the measurement input, and for directing a reflected reference beam of light from the first end of at least one reference optical fiber into the reference input, wherein the beam director is formed on an integrated optic chip.

12. The apparatus of claim 6, wherein the reference optical fiber cable comprises a plurality of reference optical fibers of different lengths, each of the measurement optical fibers having a first end and having a reflective second end.

13. An apparatus for performing differential strain measurements of a geological structure, comprising:

an interferometric readout device having a measurement input and a reference input;

a plurality of measurement/reference pairs of optical fibers, each measurement/reference pair being of a different length, each measurement/reference pair including a measurement optical fiber having a first end and having a reflective second end thereof, the measurement optical fiber being in contact with a geological structure along at least a portion of the length of the measurement optical fiber, and a reference optical fiber having a first end and having a reflective second end thereof;

a light source of an input beam of light; and a beam director including means for selectively directing the input beam of light into a selected measurement/reference pair, for directing a reflected measurement beam of light from the first end of the measurement optical fiber of the selected measurement/reference pair into the measurement input, and for directing a reflected reference beam of light from the first end of the reference fiber of the selected measurement/reference pair into the reference input.

14. The apparatus of claim 13, wherein the reference optical fiber of the measurement/reference pair passes through the geologic structure without contacting the geological structure over at least a portion of the length of the reference optical fiber.

15. The apparatus of claim 13, wherein the reference optical fiber of each pair extends parallel and adjacent to the measurement optical fiber of each pair, and wherein the reference optical fiber does not contact the geological structure.

16. The apparatus of claim 13, further including a tube through which the reference optical fiber of each measurement/reference pair passes.

17. An apparatus for performing strain measurements of a geological structure, comprising:

an interferometric readout device having a measurement input and a reference input;

a plurality of measurement/reference pairs of optical fibers, each measurement/reference pair being of a different length, each measurement/reference pair including a measurement optical fiber having a first end and having a reflective second end thereof, the measurement optical fiber being in contact with a geological structure along at least a portion of the length of the measurement optical fiber, and a reference optical fiber having a first end and having a reflective second end thereof;

a light source of an input beam of light; and a beam director including means for selectively directing the input beam of light into a selected measurement/reference pair, for directing a reflected measurement beam of light from the first end of the measurement optical fiber of the selected measurement/reference pair into the measurement input, and for directing a reflected reference beam of light from the first end of the reference optical fiber of the selected measurement/reference pair into the reference input, wherein the beam director is formed on an integrated optic chip.

18. The apparatus of claim 13, wherein the reference optical fiber is placed into a controlled-environment chamber.

19. A method for differentially measuring geological strains, comprising the steps of providing an apparatus comprising an interferometric readout device having a measurement input and a reference input, a multiplicity of measurement optical fibers each having a first end and having a reflective second end thereof, a multiplicity of reference optical fibers each having a first end and having a reflective second end thereof, a light source of an input beam of light, and a beam director including means for directing the input beam of light from the light source into both the first ends of the measurement optical fibers and the first ends of the reference optical fibers, for directing a reflected measurement beam of light from the first end of the measurement optical fibers into the measurement input, and for directing a reflected reference beam of light from the first end of the reference optical fibers into the reference input;

contacting the measurement optical fibers to a geological structure, without contacting the reference optical fibers to the geological structure, directing the input beam of light into the measurement optical fibers and the reference optical fibers; and measuring the displacement of the second end of the measurement optical fibers relative to the displacement of the second end of the reference optical fibers.

* * * * *